United States Patent [19]
Rothamel et al.

[11] Patent Number: 5,587,528
[45] Date of Patent: Dec. 24, 1996

[54] APPARATUS AND METHOD FOR CORRECTING UNBALANCE ON A MOTOR VEHICLE WHEEL

[75] Inventors: Karl Rothamel, Seeheim-Jugenheim; Lorenz Lenhardt, Griesheim; Gottfried Kühn, Weiterstadt, all of Germany

[73] Assignee: Hofmann Werkstatt-Technik GmbH, Pfungstadt, Germany

[21] Appl. No.: 450,500

[22] Filed: May 26, 1995

[30]    Foreign Application Priority Data

Jul. 26, 1994 [DE] Germany .................... 44 26 482.8

[51] Int. Cl.[6] ................................................. G01M 1/32
[52] U.S. Cl. ................................................. 73/462; 73/487
[58] Field of Search ........................... 73/462, 471, 487; 301/5.21, 5.22; 33/203.12, 555

[56]         References Cited

U.S. PATENT DOCUMENTS 5,471,874  12/1995  Rothamel et al. ................. 73/462

*Primary Examiner*—John E. Chapman
*Attorney, Agent, or Firm*—Cushman Darby & Cushman, IP Group of Pillsbury Madison & Sutro LLP

[57]          ABSTRACT

An apparatus and method for correcting unbalance of a motor vehicle wheel by at least one balancing weight has a sensor for sensing at least one predetermined position on the wheel, a position detector connected to the sensor for detecting the position thereof, and a storage device connected to the position detector for storing position data determining actual balancing positions on the wheel. An electronic evaluator is connected to a measuring arrangement for measuring wheel unbalance requiring correction and to the storage device for determining the balancing position and the magnitude of the respective balancing weight to be fixed to the wheel. A comparator is connected to the storage device and the position detector. In a retrieval mode, when the sensor reaches a position which corresponds to a stored balancing position a clamping device receives a clamping signal from the comparator for at least partially blocking displacement of the sensor.

21 Claims, 3 Drawing Sheets

APPARATUS AND METHOD FOR CORRECTING UNBALANCE ON A MOTOR VEHICLE WHEEL

BACKGROUND OF THE INVENTION

The procedure for correcting unbalance on a wheel such as a motor vehicle wheel typically involves using one or more compensating or balancing weights which are to be secured to the wheel, for example on the disk portion thereof, more particularly for example at the rim part thereof, in a suitable position which is ascertained by an electronic measuring arrangement during an unbalance measuring operation.

In such a procedure, dimensions of the wheel, more especially in the rim region thereof, can be ascertained by means of a sensing device and stored in the electronic measuring arrangement, for example as disclosed in German published specification (DE-AS) No 20 01 972 or the Hofmann operating instructions for the Geodyna 88/88m wheel balancing machine, imprint 9412145-09.86. That procedure provides that the electronic measuring arrangement is supplied with suitable items of information for calculating the sizes and angular positions of the balancing weights which are to be fitted to the disk portion of the wheel in the appropriate balancing planes.

A balancing machine for motor vehicle wheels is also to be found in DE 41 22 844 A1 corresponding to U.S. patent application Ser. No. 07/910,917 (U.S. Pat. No. 5,447,064), including a sensing device having a sensing lever or rod which is both pivotable and also adjustable in respect of length. That sensing device makes it possible to ascertain the dimensions of the rim of the wheel or the disk portion thereof, in the appropriate balancing planes, for the input of those dimensions into the electronic measuring arrangement, prior to the unbalance measuring operation being performed.

A further apparatus for correcting wheel unbalance is to be found in DE 42 29 865 A1 corresponding to U.S. patent application Ser. No. 08/115,779 (U.S. Pat. No. 5,471,874). That apparatus includes an extensible and pivotable sensing lever or rod having a sensing tip for sensing dimensions of the disk portion of a motor vehicle wheel to be balanced. The sensing lever is operatively connected to a position detecting means for generating electrical position detection signals corresponding to the respective extension length and pivotal position of the sensing lever. The position detection signals can be stored in a storage means. That apparatus further includes an electronic measuring and evaluation arrangement for evaluating measuring sensor signals which are obtained in the unbalance measuring operation, in the measuring runs carried out on the wheel requiring balancing. Those signals are stored in the storage means, constituting information in respect of magnitude and angular position, in relation to the balancing planes, for the balancing weight or weights required to be fitted to the wheel for balancing thereof. After a given balancing weight has been fitted into a weight holder which is mounted on the sensing lever at the front end thereof, the sensing lever is moved to the appropriate balancing position on the wheel. The apparatus includes a comparison means for detecting the approach to the stored position, and indicating same by means of a suitable display device. Therefore, by moving the sensing lever towards the wheel and turning the wheel into a given angular position, while observing the display afforded by the display device, the operator will find the correct balancing position for fitting the balancing weight to the wheel.

SUMMARY OF THE INVENTION

An object of the present invention is to provide a wheel balancing apparatus which is so designed as to facilitate the operation of fitting at least one balancing weight to a motor vehicle wheel in a balancing position ascertained in an unbalance measuring operation.

Another object of the present invention is to provide an apparatus for correcting unbalance on a vehicle wheel, which is capable of operating with a high degree of accuracy for fitting a balancing weight to a wheel requiring balancing, while involving a simple operating procedure.

Still another object of the present invention is to provide a method of correcting unbalance on a vehicle wheel, affording an operating procedure such as to facilitate fitting at least one balancing weight to the wheel in an ascertained balancing position.

In accordance with the principles of the present invention the foregoing and other objects are attained by the apparatus and method in accordance with the invention as set forth herein.

As will be seen from a preferred embodiment of the invention described in greater detail hereinafter, the apparatus according to the invention includes a blocking means operable in a retrieval mode in a given condition of the apparatus to retrieve the appropriate balancing position for fitting a balancing weight to the wheel requiring unbalance, insofar as the blocking means permits the operator to find the correct balancing position without any need for scrupulously observing a display which represents the approach of a sensing means to a balancing position. To find the correct balancing position, it is only necessary for the sensing means to be moved towards the stored position of the balancing plane. When the apparatus has a sensing means which can be both extended and pivoted to arrive at the correct balancing position, there is no need to maintain a given angle of pivotal movement thereof during extension of the sensing means, but on the contrary, independently of the pivotal angle of the sensing means, the longitudinal setting of the sensing means, which corresponds to the balancing position, is fixed by the blocking means, in which situation the tip of the sensing means can be moved beyond the balancing plane. Thereafter, the sensing means can be moved by a pivotal motion to bring it to the rim of the wheel requiring balancing, thereby to arrive at the balancing position for fitting the appropriate balancing weight. Accordingly it is only necessary to block the sensing means, or partially fix same, more specifically by fixing the extension in respect of length thereof, in order to enjoy the advantages of the invention. While the sensing means is pivoted into the correct balancing position, accidental modification in the length of the sensing means is effectively prevented by the blocking means according to the invention.

It will be noted hereinafter that the blocking means can also block the sensing means in such a way that the tip of the sensing means can only be moved as far as the balancing plane on the wheel, in any position of the sensing means in respect of its pivotal angle. Upon a further movement of the sensing means towards the balancing position, the blocking means releases the sensing means with an increasing pivotal angle, to such an extent that the tip of the sensing means can be guided radially outwardly in the balancing plane, relative to the rim portion of the wheel to be balanced.

The blocking means can act directly on the sensing means so that for example a sensing lever or rod of the sensing means can be blocked or fixed by a clamping action. It will be noted here that the term blocking is used to mean that the sensing means is moved into a position for example of bearing against an abutment or stop so that it cannot be further moved in the direction in which it was moved into the position of contact against the abutment or stop, but it can still be moved in the opposite direction and thus away from the abutment or stop. In contrast, the term fixing is used to mean that the sensing means also cannot move in the reverse direction.

The blocking means however can also act on a blockable or fixable element which is operatively connected to the sensing means. The blockable or fixable element can be guided by a guide means to any blocking or fixing position, thus affording a structurally simple design configuration, in particular when the blockable or fixable element is flexible and can be wound on to a roll where it can be disposed in a compact configuration. In that respect it is advantageous for the roll to be subjected to a prestressing force so as to eliminate any play or flexing of a blockable or fixable element which for example is in the form of a cable or strip, thereby to guarantee reproducibility of the setting of the sensing means when it is fixed or blocked.

Further objects, features and advantages of the present invention will be apparent from the following description of a preferred embodiment.

DESCRIPTION OF THE PREFERRED EMBODIMENT

Figure 1:
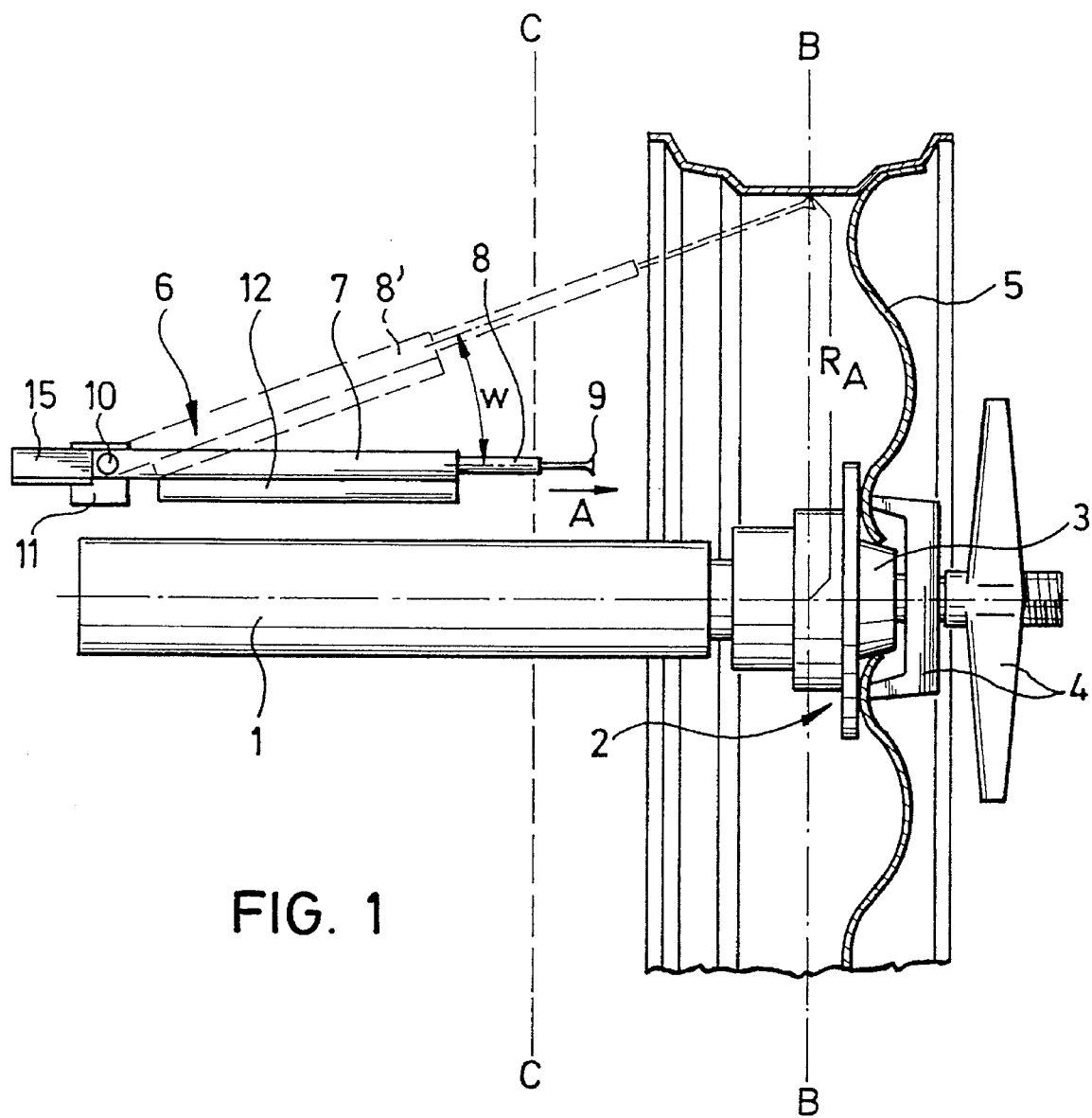
FIG. 1 is a partly broken-away diagrammatic front view showing the arrangement of the apparatus according to the invention on a balancing machine of which only the main shaft with a wheel clamping arrangement and a motor vehicle wheel to be balanced is shown, for the sake of simplicity of the drawing.

Referring firstly to FIG. 1, shown therein is a main shaft 1 of a balancing machine with associated wheel clamping and centering arrangement comprising a clamping flange 2 which is non-rotatably connected to the main shaft 1, a cone 3 and clamping elements 4 for clamping in position a disk portion 5 of a motor vehicle wheel to be balanced in the machine.

Figure 2:
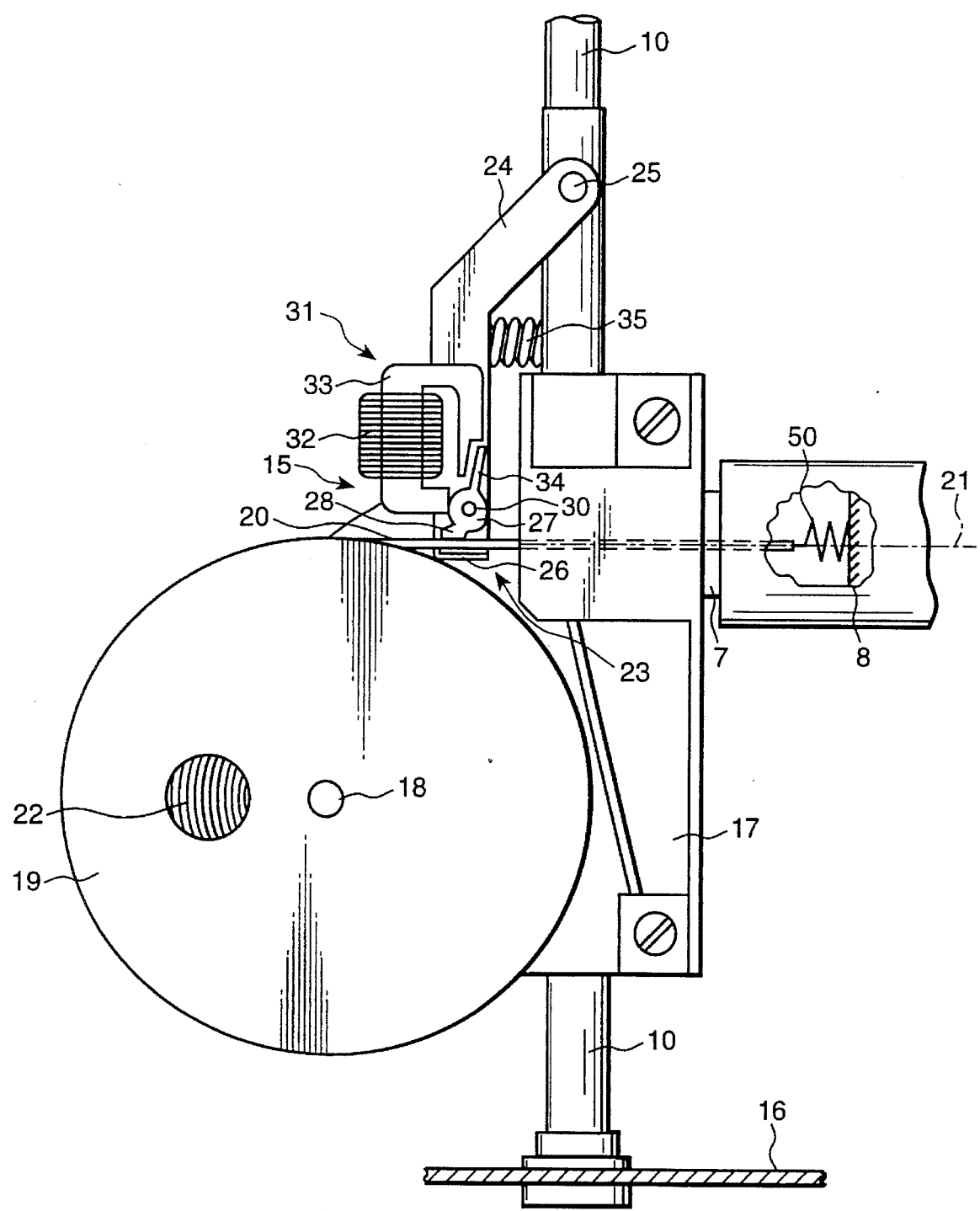
FIG. 2 is a plan view of the apparatus according to the invention with its blocking device.

Reference numeral 6 in FIG. 1 indicates a sensing means comprising a guide rod or bar 7 which is oriented in the initial position of the sensing means in parallel relationship with the main shaft 1. The sensing bar 7 carries an extensible guide bar or lever 8 which is mounted axially displaceably thereon, with a sensing tip 9 which can thus be extended in the direction indicated by the arrow A in FIG. 1. The sensing bar 8 can comprise a plurality of elements constituting a telescopic assembly. The guide bar 7 can be tubular and surround the sensing bar 8, as shown in FIG. 1, or it can be arranged within the sensing bar 8, as shown in FIG. 2. The sensing bar 8 is mounted with its one end pivotably about a pivot axis 10 which is arranged stationarily with respect to the main shaft 1, through an angle as indicated at w, which is dependent on the position of the sensing tip 9, into a position indicated by way of example in broken line and identified by reference numeral 8'. The pivot angle w is measured by means of a position detecting device in the form of an angle measuring device 11. The sensing tip 9 includes a weight holder which is not shown in FIG. 1 for carrying a balancing weight, more especially for example an adhesive weight which is thus fitted to a wheel to be balanced at a suitable balancing position thereon by being glued thereto.

A longitudinal slot which is not shown in FIG. 1, in the housing wall which is only indicated by the broken line C—C of the balancing machine can provide that, in addition to its mounting which only permits pivotal movement of the sensing bar 8 in a plane perpendicularly to the pivot axis 10, the sensing bar 8 is always pivotable only in a plane which is common to the longitudinal center line of the shaft 1, being a perpendicular plane in the illustrated embodiment. That precautionary measure prevents damage to the pivot mounting assembly for the sensing bar 8. The distance between the sensing bar 8 in the initial position or rest position thereof and the longitudinal center line of the main shaft 1 is so selected that the sensing tip 9 can move to even the smallest possible balancing radius, relative to the portion 5 of the wheel to be balanced.

As is clearly apparent from FIG. 1 the sensing device 6 of the above-described configuration permits the sensing tip 9 to be moved without difficulty to any locations on the disk portion or body portion 5 of the wheel, and thus makes it possible for example to detect a balancing plane as indicated at B—B in FIG. 1, together with the appropriate balancing radius as indicated at $R_A$ in FIG. 1. The respective degree of extension A of the sensing tip 9 is measured by any suitable length measuring device as indicated at 12 in FIG. 1 which includes for example a linear potentiometer and which is designed as disclosed for example in German published specification (DE-AS) No 20 01 972 to which attention may therefore be directed in this respect. The pivot angle w is measured by any suitable angle measuring device as indicated at 11 in FIG. 1, which includes for example a rotary potentiometer and possibly additional drive means.

The output signals which are supplied by the angle measuring device 11, in respect of the ascertained pivot angles which are proportional to the balancing radii as indicated at $R_A$, as well as the output signals of the length measuring device 12 relating to axial displacement or extension of the sensing bar 8 are fed to a first computing means in which the spacing of the balancing plane B—B from the reference plane C—C which is fixed in relation to the balancing machine and the balancing radius $R_A$ which is associated with the respective balancing plane are calculated on the basis of known geometrical algorithms. Those algorithms are simple geometrical relationships which can be readily derived from the geometrical dimensions which are structurally predetermined by virtue of the design configuration of the balancing machine.

Data in respect of the width of the wheel to be balanced are fed to a second computing means which is connected to the first computing means. The wheel width can be ascertained for example in any suitable fashion by means of a wheel rim width sensing device and manually or automatically inputted into the second computing means.

Figure 3:
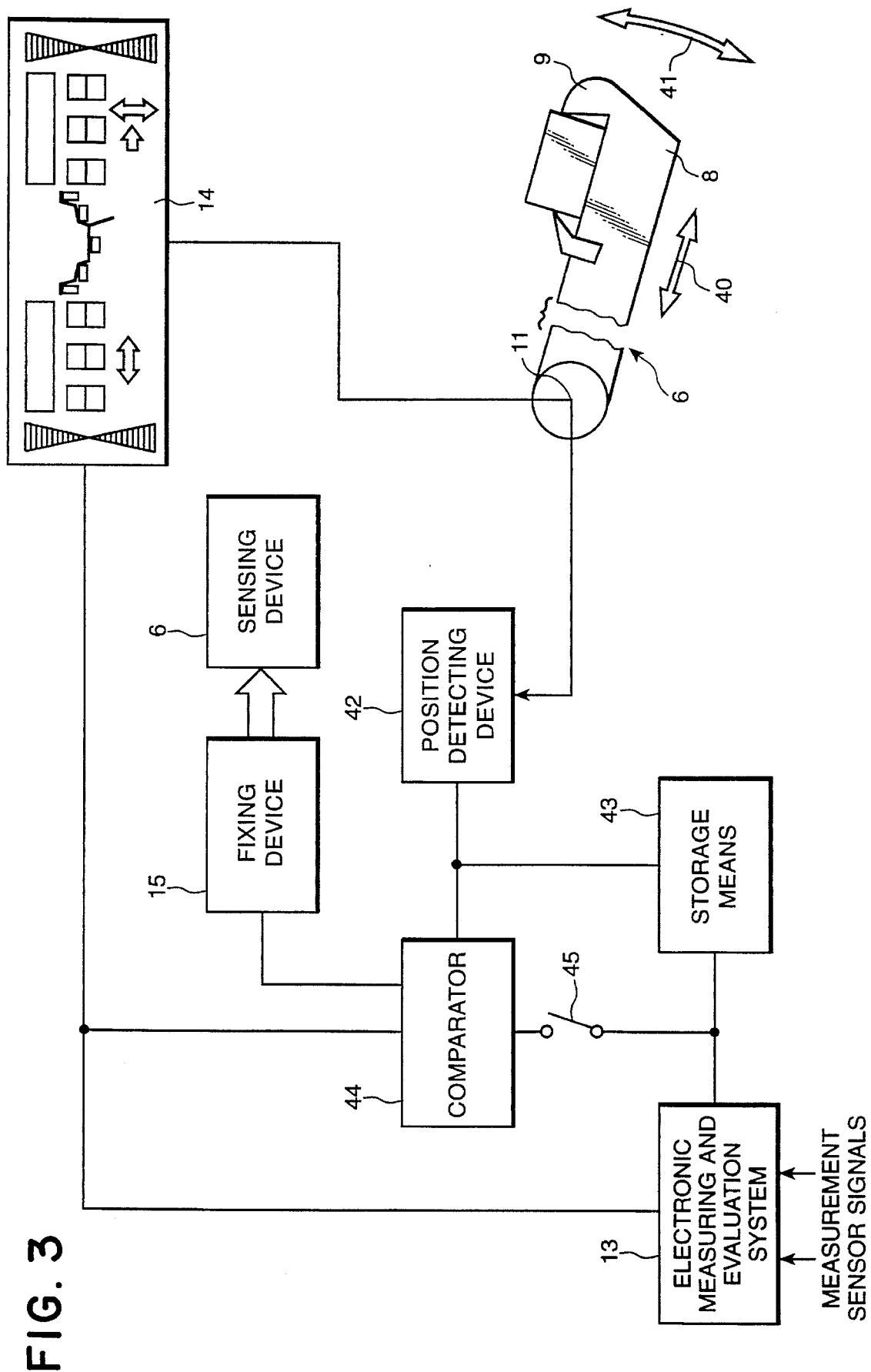
FIG. 3 shows a block circuit diagram of a diagrammatically illustrated sensing device with evaluation arrangement connected thereto.

The data ascertained in the above-indicated manner in regard to the spacing between the planes B—B and C—C, the balancing radius and the wheel rim width are transmitted to an electronic evaluation system which is indicated at 13 in FIG. 3 and which may possibly be provided with a suitable display device as indicated at 14. In the electronic evaluation system 13 the above-mentioned data are linked in the unbalance measuring operation with the measurement values which are supplied by the measurement value sensors in known manner, and the appropriate balancing weights and angular positions for fitting one or more balancing weights to the motor vehicle wheel to be balanced are ascertained.

Reference will now be made to FIG. 2 in which reference numeral 15 denotes a blocking device which is disposed in the region of the pivot axis 10 of the sensing device 6. The pivot axis 10 is mounted in a front wall 16 of the machine, a portion of the front wall 16 only being shown in FIG. 2. A guide bar holder 17 is fixed to the pivot axis 10 for example by means of a screw clamping assembly. The guide bar holder 17 has a mounting trunnion 18 on which a cable roll 19 is rotatably mounted, a cable 20 which is connected to the extensible sensing bar 8 being wound on the cable roll 19. The cable roll 19 is positioned in such a way that its winding periphery is in the region of the longitudinal axis as indicated at 21 of the guide bar 7 or the sensing bar 8. Then, the cable 20 which is guided in the guide bar 7 is wound on the cable roll 19 without undergoing a substantial change in direction. Mounted in or on the cable roll 19 is a spiral spring 22 which prestresses the cable roll 19 in opposite relationship to the direction of extension of the sensing bar 8, that is to say in the counter-clockwise direction in FIG. 2, so that the cable 20 is held taut under tension both in the inserted or retracted position of the sensing bar 8 and also in the extended position thereof.

In addition the blocking device 15 includes a clamping device 23 which can act on the cable 20 in the vicinity of the cable roll 19 and fix the cable 20 in position. The clamping device 23 includes a carrier arm 24 which is fixed to the pivot axis 10 rotatably by a mounting trunnion 25 so that it is pivotable in a plane which contains the cable 20. At its free end the carrier arm 24 has a pressure plate 26 and a clamping lever 27. The pressure plate 26 is disposed approximately parallel to the cable 20 and with a clamping surface 28 of the clamping lever 27 it forms a gap through which the cable 20 is passed; it can bear against the pressure plate 26 or can extend past same at only a slight spacing therefrom. The clamping lever 27 is pivotably mounted at a mounting trunnion 30 and urged by a spring (not shown) into a release position in which the cable 20 is freely movable through the above-mentioned gap. A solenoid 31 for actuating the clamping lever 27 is mounted on the carrier arm 24. The solenoid 31 includes a solenoid coil 32 which, upon being energized by a control current, magnetizes a soft iron core 33. The magnetic force produced thereby acts on an arm 34 of the clamping lever 27 and rotates the clamping lever 27 against the force of the above-mentioned spring into a clamping position, being a position in which the clamping surface 28, which is in the form of a curve or cam portion of increasing radius, presses the cable 20 against the pressure plate 26 and in so doing fixes it in position. The clamping surface 28 has a self-locking action in the direction of extension of the cable 20 from the cable roll 19. The carrier arm 24 is supported at the pivot axis 10 by means of a spring 35 which has a high level of spring stiffness so that only a slight pivotal movement of the carrier arm 24 is permitted. When the sensing bar 8 is extended and thus the cable 20 is unwound from the cable roll 19, therefore after the solenoid 31 has been activated and the cable 20 has been clamped fast by the clamping lever, the sensing bar 8 can still be moved by a slight pivotal movement of the carrier arm 24, which is dependent on the force of the spring 35. That permits the sensing bar 8 to move gently into a clamping position.

In accordance with a further construction the carrier arm 24 is arranged fixedly on the guide bar holder 17 or the clamping device 23 is mounted directly on the guide bar holder 17. If the gentle movement into the clamping position of the sensing bar 8, for a balancing operation, as referred to above, is required, the cable 20 can be fixed to the sensing bar 8 elastically, for example by way of a spring 50. As in the above-described situation, that spring provides that, when the clamping device 23 is triggered and produces its clamping action, the extension movement of the sensing bar 8 is not abruptly braked, but it covers a short distance which is always of the same length, under a progressively increasing tensile force. The operator thus has the feeling that the sensing bar 8 has encountered a soft abutment. At the same time, that arrangement ensures that the forces acting on the cable 20 are limited when the assembly takes up the clamping condition.

The illustrated sensing device 6 can be used not only in the sensing mode for sensing a disk wheel, in particular in the rim region thereof, but it also serves together with the described blocking device 15 and the clamping device 23 in a retrieval mode, for facilitating arranging balancing weights on the disk wheel or rim portion as indicated at 5, in the correct position thereon, after an unbalance measuring operation has been carried out on the wheel.

Reference will now be made to FIG. 3 to describe triggering or activation of the clamping device 23 in the retrieval mode of the apparatus. FIG. 3 diagrammatically shows the described sensing device 6 with the sensing bar 8 which is extensible as indicated by the double-headed arrow 40 and pivotable as indicated by the double-headed arrow 41. For purposes of detecting the position of the sensing bar 8, as referred to above, the sensing bar 8 is connected to a position detecting device which is indicated at 42 in FIG. 3 and which produces electrical position detecting signals which are proportional to the respective sensing bar extension length as indicated by the double-headed arrow 40 and the sensing bar pivotal position as indicated by the double-headed arrow 41, such signals therefore being proportional to the positioning of the sensing bar 8. A form of sensing device with position detection which can be used here is described in detail in above-mentioned DE 41 22 844 A1 corresponding to U.S. patent application Ser. No. 07/910, 917 (U.S. Pat. No. 5,447,064) to which reference may therefore be directed for incorporating the disclosure thereof into this specification. The position detecting device 42 may have a potentiometer 11 for detecting the position in terms of pivot angle of the sensing bar 8, as indicated by the double-headed arrow 41, and a linear potentiometer 12 for detecting the sensing bar extension length as indicated by the double-headed arrow 40.

The analog signals produced by the potentiometers 11 and 12 can be stored in a suitable storage means after digitization thereof. For that purpose a storage means as indicated at 43 in FIG. 3 is connected to the position detecting device 42. The storage means 43 is a component of the electronic measuring and evaluation system 13 (which can be found for example in Hofmann-news 5, imprint 09.85D), in which measurement sensor signals which are obtained in an unbalance measuring operation in the measuring runs carried out on a wheel whose unbalance is to be corrected are evaluated. The evaluated measurement sensor signals can then be displayed by the display device 14 in the form of displays in respect of magnitude and angular positioning for the balancing weights which are to be fitted to the motor vehicle wheel. Connected both to the storage means 43 and to the position detecting means 42 is a comparator 44 which is connected to the blocking device 15 and possibly to the display device 14.

For switching on the operating mode of retrieval of the respective balancing plane and balancing position in the balancing operation, a switch as indicated at 45 can be actuated manually or automatically by an operating procedure program or by a given control movement of the sensing bar 8. As the sensing bar 8 moves into the previously ascertained and stored balancing position, the comparator 44 is operable to compare the position data provided by the position detecting device 42, to the stored target or balancing position data. When the sensing bar 8 is extended to the length corresponding to the appropriate balancing position, that is detected by the comparator 44 and it passes a blocking or holding signal to the blocking or holding device 15 or the clamping device 23 for fixing the sensing device 6 or the sensing bar 8 thereof in its longitudinal direction. The appropriate balancing position is then reached by pivoting the sensing bar 8 to a position of touching the wheel to be balanced at the rim portion 5 thereof, the wheel having been previously turned to a position corresponding to the correct balancing angle, for example into the 12 o'clock position by using the display afforded by the display 14 or by means of an acoustic signal or by using a controlled drive. The wheel can however also be turned into the appropriate angular position during the sensing movement of the sensing device or after it has reached the balancing plane. When a weight holder for carrying a balancing weight is mounted at the tip 9 of the sensing bar 8, a balancing weight can then be positioned at the rim of the wheel by means of the tip of the sensing bar 8.

As indicated above, a rotary potentiometer can be mounted on the cable roll 19, as part of the position detecting device 42, for detecting the extension length of the cable 20 and thus the sensing bar 8. In this case it is possible to omit the linear measuring device 12 on the sensing bar 8.

Instead of the cable 20 it is also possible to use a suitable bendable metal or plastic strip as the blockable or fixable element, being stiff in relation to pressure in the longitudinal direction thereof. In that case there is no need for a spring for prestressing the winding roll 19, as in the case of using a cable 20.

It will be appreciated that the above-described apparatus and method according to the present invention have been set forth solely by way of example and illustration of the principles of the invention and that various modifications and alterations may be made therein without thereby departing from the spirit and scope of the invention.

What is claimed is:

1. Apparatus for correcting unbalance of a motor vehicle wheel by at least one balancing weight, comprising: a sensing means for sensing a predetermined position on the wheel by being displacable toward and away from said wheel; a position detecting means connected to the sensing means for detecting the position thereof; a storage means connected to the position detecting means for storing position data determining actual balancing positions on the wheel; an electronic evaluation means connected to a measuring arrangement for measuring unbalance means connected to a measuring arrangement for measuring unbalance and to said storage means, for determining the balancing position and the magnitude of a balancing weight to be fixed to the wheel; a comparison means connected to said storage means and said position detecting means; a member operatively connected to said sensing means and which is movable therewith when said sensing means is displaced; and a clamping device adapted to at least partially hold said member in response to receipt of a clamping signal from said comparison means in a retrieval mode upon the attainment of a position of the sensing means which is determined by a stored balancing position.

2. Apparatus as set forth in claim 1 wherein said member is bendable, and wherein said apparatus further includes a roll on which said member can be wound.

3. Apparatus as set forth in claim 3 including spring means for holding said roll in a prestressed condition in opposition to the unwinding direction thereof.

4. Apparatus as set forth in claim 1 including an electromagnet means actuable by the clamping signal for holding said member.

5. Apparatus as set forth in claim 4 wherein said clamping device includes a clamping lever actuable by the electromagnet means for clamping said member.

6. Apparatus as set forth in claim 5 wherein said clamping lever is adapted to be self-locking in the direction of extension of said member.

7. Apparatus as set forth in claim 1 wherein said clamping device includes a pressure plate against which said member is blockingly pressed.

8. Apparatus as set forth in claim 1 wherein said clamping device includes a clamping lever for clamping said member.

9. Apparatus as set forth in claim 1 wherein said member is elastically fixed to the sensing means.

10. Apparatus as set forth in claim 9 including a spring connecting said member to the sensing means.

11. Apparatus as set forth in claim 1 wherein said member is coupled to the position detection means.

12. Apparatus as set forth in claim 1 wherein said clamping device comprises a pressure plate, a clamping member operable to clamp said member against the pressure plate, an electromagnet means for moving the clamping member into the clamping position, a pivotable carrier carrying the electromagnet means, the clamping member and the pressure plate, and a spring supporting the pivotable carrier.

13. Apparatus as set forth in claim 1 wherein said sensing means, said member, and said clamping device are pivotable about a pivot axis.

14. Apparatus as set forth in claim 13 wherein the pivot axis is horizontal and perpendicular to an axis of rotation of a wheel to be balanced.

15. Apparatus as set forth in claim 1 wherein the sensing means has a weight holder.

16. Apparatus as set forth in claim 1 wherein the sensing means has an axially extensible sensing bar and a pivotable guide bar for the sensing bar.

17. Apparatus as set forth in claim 1 wherein a pulling force to the sensing means is transferred to said member.

18. Apparatus as set forth in claim 1 wherein said member comprises a wire.

19. Apparatus as set forth in claim 1 wherein said member comprises a cable.

20. Apparatus as set forth in claim 1 wherein said member comprises a strip.

21. Apparatus as set forth in claim 1 including a display means adapted to receive a signal from the position detecting means for representing the position of the sensing means.

\* \* \* \* \*